United States Patent
Urushiyama et al.

(10) Patent No.: US 6,286,895 B1
(45) Date of Patent: Sep. 11, 2001

(54) CONTROL DEVICE FOR CONTROLLING RIGIDITY AND DEFORMATION OF CAR BODY

(75) Inventors: Yuta Urushiyama; Eisei Higuchi, both of Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/722,323

(22) Filed: Nov. 28, 2000

Related U.S. Application Data

(62) Division of application No. 09/285,239, filed on Apr. 2, 1999, now Pat. No. 6,193,303.

(30) Foreign Application Priority Data

Apr. 3, 1998 (JP) .................................................. 10-091552
Jul. 22, 1998 (JP) .................................................. 10-206156

(51) Int. Cl.$^7$ ................................ B60J 7/00; B62D 21/00
(52) U.S. Cl. .......................... 296/188; 296/189; 280/784; 188/371; 188/377
(58) Field of Search .................................... 296/188, 189, 296/203.01, 204; 180/274; 280/784; 188/371, 372, 376, 377; 267/136

(56) References Cited

U.S. PATENT DOCUMENTS

| | | |
|---|---|---|
| 3,842,930 | 10/1974 | Fiala . |
| 3,893,726 | 7/1975 | Strohschein . |
| 5,460,421 | 10/1995 | Culbertson . |
| 6,019,419 | 2/2000 | Browne et al. . |
| 6,113,178 | * 9/2000 | Faigle ..................................... 296/189 |
| 6,203,098 | * 3/2001 | Motozawa et al. ................... 296/189 |

* cited by examiner

Primary Examiner—D. Glenn Dayoan
Assistant Examiner—Patricia Engle
(74) Attorney, Agent, or Firm—Sughrue, Mion, Zinn, Macpeak & Seas, PLLC

(57) ABSTRACT

A control device for controller rigidity of a car body has a device for adjusting rigidity of a right side frame and a left side frame extending in the longitudinal direction of a car. The device is attached to the side frames. The control device has a controller for controlling operation of the device for adjusting rigidity of the right and left side frames according to a form of collision judged by an output of a collision detector such as an acceleration sensor. Further, a control device for controlling deformation of a frame has an actuator for generating a force in a direction of restricting or facilitating deformation of a frame, an external force detection sensor for detecting an external force inputted into the frame, and a controller for controlling operation of the actuator according to an output signal of the external force detection sensor. The actuator is arranged in a portion of the frame in which deformation of the frame greater than that of the periphery is predicted. Due to the foregoing, rigidity of the right and left side frames can be adjusted to a value appropriate for a form of collision by the device for adjusting rigidity of a right and a left side frame. Accordingly, it is possible to absorb an impact of collision appropriately in any form of collision including overall collision and partial collision.

2 Claims, 17 Drawing Sheets

CONTROL DEVICE FOR CONTROLLING RIGIDITY AND DEFORMATION OF CAR BODY

This is a Division of Application No. 09/285,239 filed Apr. 2, 1999, now U.S. Pat. No. 6,193,303 the disclosure of which is incorporated herein by reference.

BACKGROUND OF THE INVENTION

1. Field of the Invention

The present invention relates to a control device for controlling rigidity of a car body or deformation of a frame of a car body. An appropriate level of rigidity can be provided by the control device according to a form of collision of the car having a structure of absorbing an impact generated by collision.

The present application is based on Japanese Patent Applications No. Hei. 10-91552 and No. Hei. 10-206156, which are incorporated herein by reference.

2. Description of the Related Art

Since rigidity of a car body has an important effect upon safety of driving of the car, various countermeasures are taken for enhancing rigidity of the car. For example, frame members composing the car body are composed of steel plates of high strength, thickness of the frame members is increased, and reinforcement members are attached to appropriate portions of the frame members. At the same time, from the viewpoint of protecting passengers in the case of collision, it is desirable to provide a body structure capable of appropriately absorbing energy generated in collision. This absorption of impact energy generated in collision is mainly conducted by plastic deformation of a right and a left side frame extending in the longitudinal direction at the front portion of the car body. When rigidity of the side frames is appropriately set, deceleration generated in a passenger's chamber in the case of collision can be reduced, and the passenger is given an impact, the intensity of which is reduced.

In the case of a form of collision such as a front barrier collision in which the front surface of a car body collides entirely (this form of collision will be referred to as an overall collision in this specification hereinafter), an external force given to the car in collision is dispersed to the right and the left side frame. On the other hand, in the case of a form of collision such as an offset collision in which the front surface of a car body partially collides (this form of collision will be referred to as a partial collision in this specification hereinafter), an external force given to the car in collision is concentrated upon one of the side frames. For the above reasons, the following problems may be encountered. For example, when rigidity appropriate for partial collision is set in each side frame, the rigidity becomes too high when an impact of collision is absorbed in the case of an overall collision, and a high deceleration is generated. On the other hand, when rigidity appropriate for overall collision is set in each side frame, the rigidity becomes insufficient in the case of a partial collision, and an impact can not be sufficiently absorbed and the passenger's chamber is greatly affected by the collision. As described above, it is difficult to compose the side frames so that the most appropriate impact absorption can be conducted by them in both forms of collision.

Further, physical strength such as rigidity or breaking characteristic is affected by a stress-strain characteristic of material itself. Further, physical strength is affected by a sectional form represented by moment of inertia of area, and a shape in the longitudinal direction of a frame represented by a neutral axis of the frame. Furthermore, deformation of the frame is changed by an intensity and direction of an external force inputted into the frame, and a mechanical strength of the frame is greatly changed by a state of deformation. For example, when the frame is given an external force of a direction in which bending moment is generated in the frame, in many cases, the bending strength is insufficient compared with the compression strength. Therefore, buckling is caused in the frame. Accordingly, the mechanical strength is greatly insufficient compared with a case in which the frame is given an external force in the axial direction.

Consequently, in order to obtain predetermined rigidity and breaking characteristic, it is necessary to consider a state of deformation of the frame according to an intensity and direction of a predicted external force when a shape of the frame is designed. It is possible to optimize the shape of the frame by conducting a prediction in simulation or making experiments. However, from the actual viewpoint, it is very difficult to realize the most appropriate shape and state of deformation of the frame, because the manufacturing cost, space and weight are restricted.

SUMMARY OF THE INVENTION

The present invention has been accomplished to solve the above problems of the conventional art. It is an object of the present invention to provide a control device for controlling rigidity of a car body by which an appropriate impact absorption can be conducted irrespective of a form of collision.

It is another object of the invention to provide a control device for controlling deformation of a frame capable of obtaining a predetermined strength characteristic by controlling a state of deformation of the frame without relying on the shape.

In order to accomplish the above objects, the present invention provides a control device for controlling rigidity of a car body comprising: a means 4 for adjusting rigidity of a right and a left side frame 2, 3 extending in the longitudinal direction of the car 1, the means being attached to the side frames 2, 3; and a control means 8 for controlling operation of the means for adjusting rigidity of a right and a left side frame according to a form of collision judged by an output of a collision detection means 5. Due to the foregoing, rigidity of the right and the left side frame can be adjusted to values appropriate for the form of collision by the means for adjusting rigidity of the right and the left side frame. Accordingly, it is possible to absorb an impact of collision appropriately in any form of collision including overall collision and partial collision.

The means for adjusting rigidity of the side frame is a solid element actuator such as a piezoelectric element or a magentostriction element to generate a force in a direction of restricting plastic deformation of the side frame or facilitating plastic deformation of the side frame. Alternatively, the means for adjusting rigidity of the side frame is a reinforcement member capable of being displaced between a position at which rigidity of the side frame is enhanced and a position at which no influence is given to rigidity of the side frame. Further, it is possible to provide the same action by using a reinforcement member combined with the side frame via explosion bolts which are broken according to an operation signal sent from the control means.

In this connection, examples of the collision detection means are: an acceleration sensor for detecting acceleration generated in the longitudinal direction of a car body in collision; a strain sensor for detecting strain generated in the side frame in collision; and a displacement sensor for detecting displacement of a measurement point which is caused by deformation of the car body in collision, wherein the measurement point is appropriately set in the side frame or bumper attaching member. Concerning the acceleration sensor, it is possible to use a piezoelectric element from which a voltage signal is outputted according to strain, a semiconductor, the resistance of which is changed by strain, and glass fibers, the transmission characteristic of which is changed by strain, and acceleration can be detected by strain caused in a support section of the sensor. Concerning the strain sensor, the sensors described in the above acceleration sensor can be used. In addition to that, it is possible to use a solid element actuator composed of a piezoelectric element or a magentostriction element. Concerning the displacement sensor, it is possible to use a variable resistor, a laser beam displacement meter, and a limit switch, the structure of which is a simple gap type.

Further, in order to accomplish the above objects, the present invention provides a control device for controlling deformation of a frame comprising: an actuator 2 for generating a force in a direction of restricting or facilitating deformation of a frame 1; an external force detection sensor 3 for detecting an external force inputted into the frame; and a controller 4 for controlling operation of the actuator according to an output signal of the external force detection sensor, wherein the actuator is arranged in a portion 6 of the frame in which deformation of the frame greater than that in the periphery is predicted, so that deformation of the frame is suppressed or a shape of the frame is induced to a predetermined shape according to the external force obtained from the output of the external force detection sensor.

Due to the foregoing, it is possible to control a state of deformation of the frame by suppressing deformation of the frame member and inducing the frame member into a predetermined shape when the actuator is operated according to an intensity and direction of an external force given to the frame. Therefore, it is possible to arbitrarily change various strength characteristics of the frame such as a breaking characteristic and vibration characteristic which are determined by the shape of the frame.

The aforementioned portion of the frame member, in which deformation greater than that of the periphery is predicted, is defined as a portion in which the mechanical strength is lower than that of the periphery because of a restriction of space and weight. Further, the aforementioned portion of the frame member, in which deformation greater than that of the periphery is predicted, is defined as a portion, the mechanical strength of which is the same as that of the periphery, however, stress of deformation is concentrated upon the portion due to the shape of the cross-section of the frame, a state of the neutral axis and an arrangement of the reinforcement member, so that deformation greater than that of the periphery is caused in the portion. This portion may be necessarily or intentionally formed in the frame.

When an actuator is arranged at a position corresponding to the above portion in which the occurrence of great deformation is predicted, it becomes possible to effectively control the strength characteristic of the frame. When an amount of deformation of the frame with respect to a force generated by the actuator is increased in this portion, the mechanical strength of which is low, it is possible to realize control of deformation of the frame by an actuator of a relatively small capacity. Actually, the portion of great deformation in which the actuator is arranged is specified, and the arrangement of the actuator and the method of control conducted by the controller are determined by making experiments and simulation in which various conditions such as an intensity and direction of a predicted external force are considered.

Concerning the actuator for conducting deformation control in an elastic deformation region of the frame in accordance with a relatively low intensity of external force given to the frame such as a vibration force, it is necessary to provide a characteristic in which the actuator is restored to the initial state when the external force is removed. In order to provide such a restoring property to the actuator, it is preferable to use a magentostriction element in which a force is generated according to an intensity of the magnetic field. It is also possible to use a piezoelectric element in which a force is generated according to voltage impressed upon the piezoelectric element.

On the other hand, the actuator to be operated in a plastic deformation region of the frame may be an actuator capable of outputting a force corresponding to a predicted external force, that is, it is unnecessary to provide the aforementioned restoring property. Such an actuator may be composed of a magentostriction element, however, the actuator may be composed of a member made of shape-memory alloy, which is previously deformed by compression, and an electrically heating body for heating the member made of shape-memory alloy according to a control signal sent from the controller. Due to the foregoing, it is possible to obtain a force for restricting and facilitating deformation of the frame by a restoring force of the member of shape-memory alloy heated by the heating body.

An example of the aforementioned external force detection sensor is a strain sensor for detecting strain generated in the frame itself or other members connected to the frame. In order to detect an external force of collision, it is preferable to provide an acceleration sensor for detecting acceleration generated in a car body in collision. When the acceleration sensor is used, it is possible to detect an input of the external force earlier than a strain sensor, and predetermined deformation control can be started immediately. Further, it is possible to adopt a displacement sensor for detecting displacement of a measurement point located at an appropriate position when a member is deformed. In this connection, concerning the detection of a direction of the external force, even if an external force detection sensor capable of detecting an external force in a single direction is used, it is possible to detect the direction of the external force when a plurality of the sensors are arranged and intensities of external forces detected by the sensors are compared with each other.

Features and advantages of the invention will be evident from the following detailed description of the preferred embodiments described in conjunction with the attached drawings.

DETAILED DESCRIPTION OF THE PREFERRED EMBODIMENTS

Referring to the appended drawings, the structure of the present invention will be explained in detail.

Figure 1:
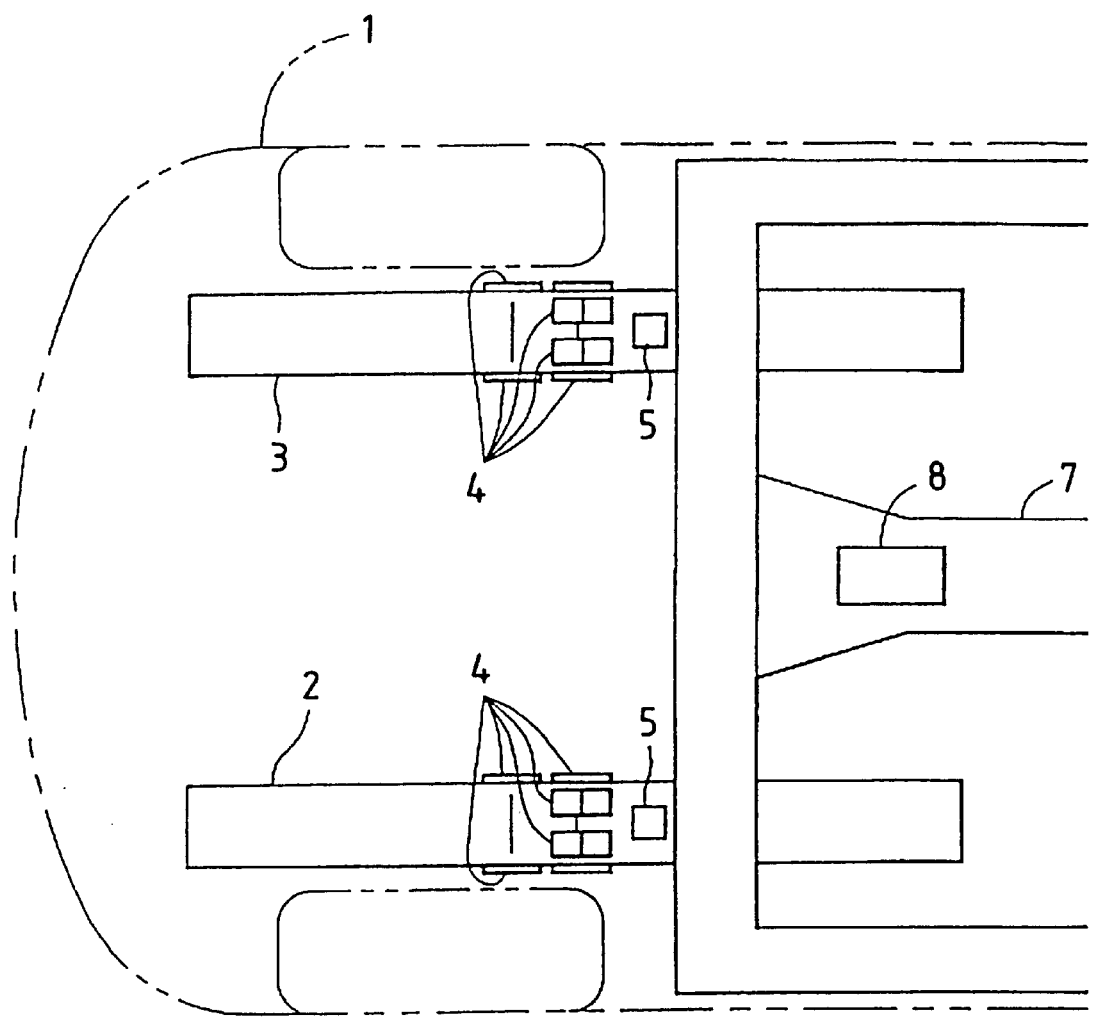
FIG. 1 is an upper surface view showing a state in which a control device for controlling rigidity of a car body of the present invention is applied to a car body frame.

FIG. 1 is a view showing a control device for controlling rigidity of a car body of the present invention. This control device for controlling rigidity of a car body includes: a plurality of piezoelectric actuators 4, which are a frame rigidity adjustment means, attached to the right and the left side frame 2, 3 which extend in the longitudinal direction of a car body 1; a pair of acceleration sensors 5, which are an impact detection means, attached to the right and the left side frame 2, 3; and a controller 8, which is a control means, arranged on a center frame 7. Rigidity of the side frames 2, 3 is relatively low so that it can meet a requirement in the case of overall collision.

Figure 2:
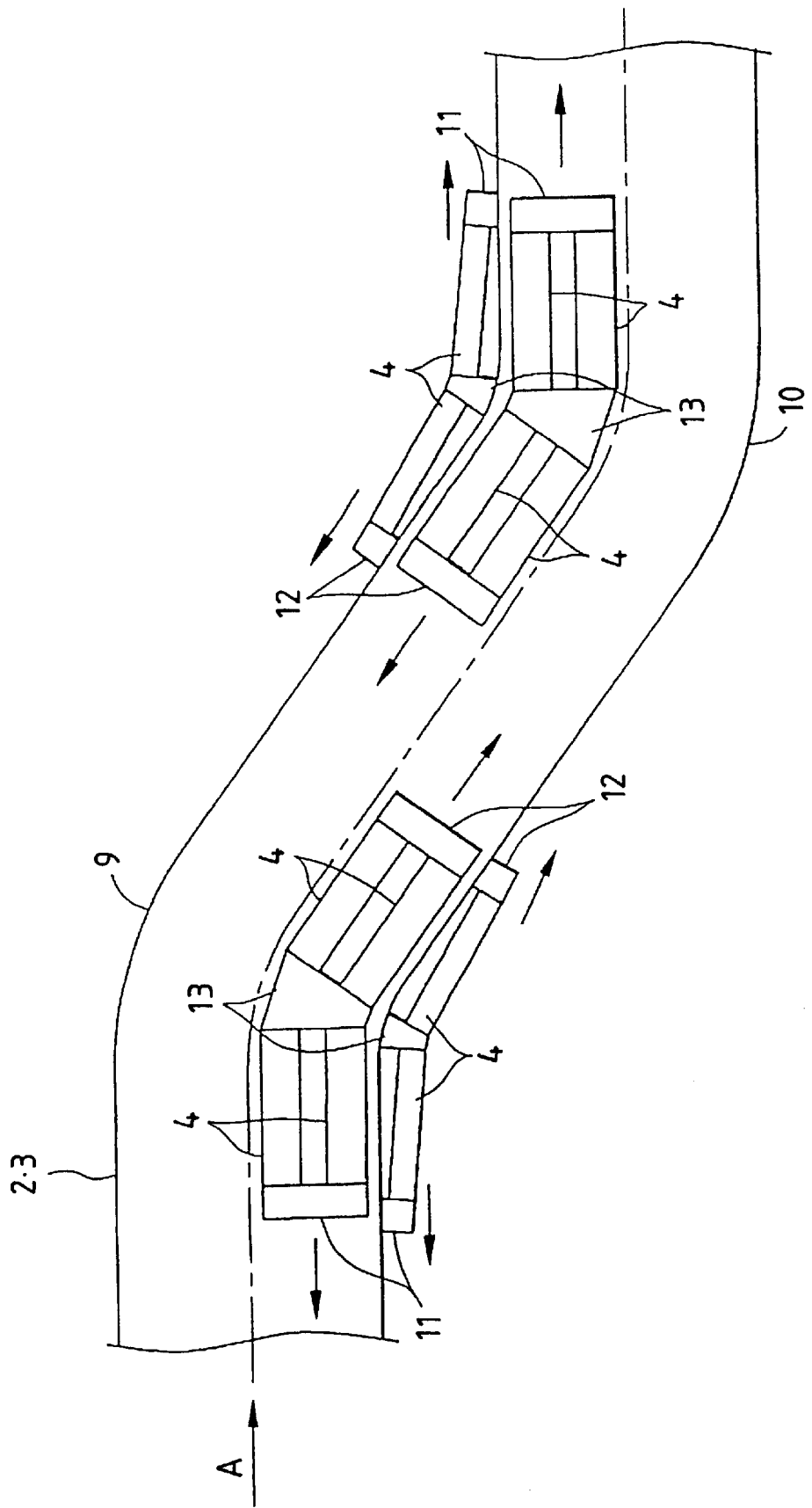
FIG. 2 is a perspective view showing a primary portion of a side frame into which the piezoelectric actuator shown in FIG. 1 is incorporated.

As shown in FIG. 2, the piezoelectric actuators 4 are arranged being interposed between the end portion attaching members 11, 12 and the intermediate portion attaching member 13, wherein the end portion attaching members 11, 12 and the intermediate portion attaching member 13 are tightly fixed onto outer wall surfaces of the side frames 2, 3 in the portions inside the neutral surface of two curved sections 9, 10 in the crank-shaped curved sections of the side frames 2, 3. Under the above condition, pairs of piezoelectric actuators are arranged in series. The pairs of piezoelectric actuators 4 are arranged being bent along the axial line of the side frame 2, 3 while the intermediate attaching sections 13 are interposed between the pairs of piezoelectric actuators 4.

Figure 3:
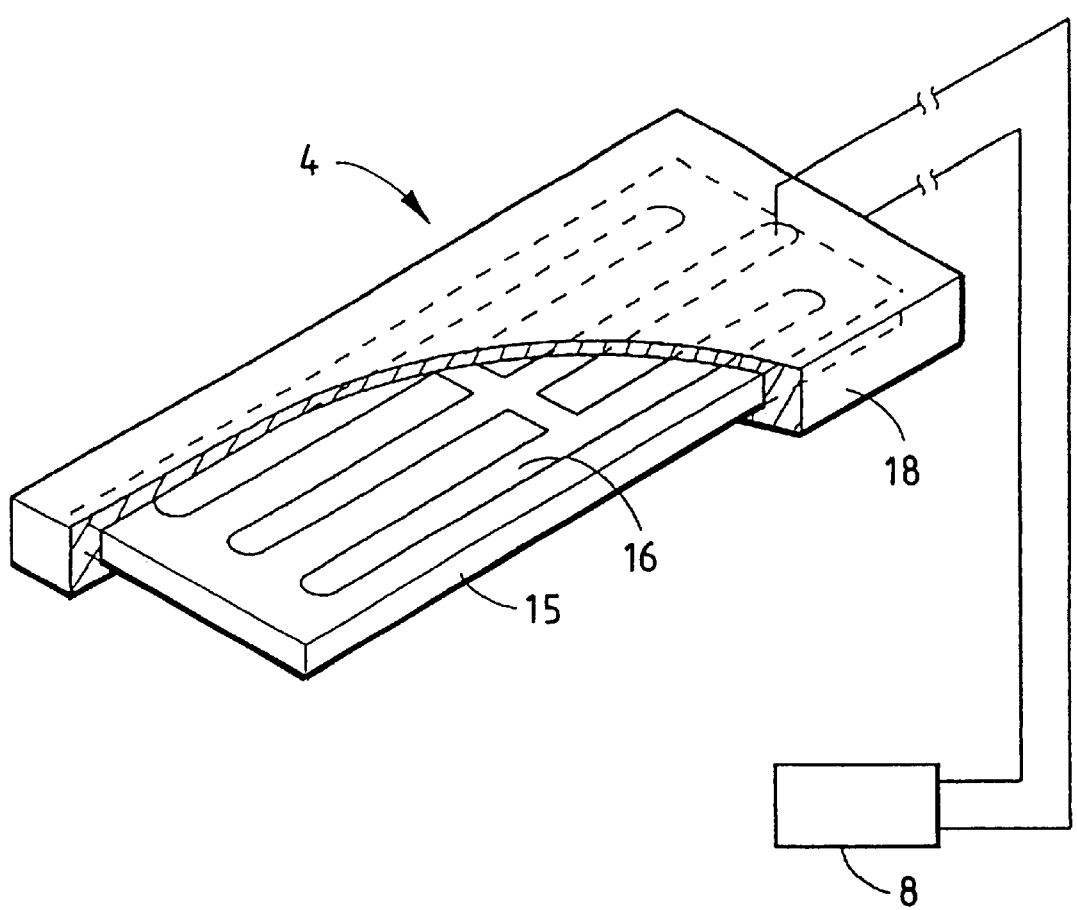
FIG. 3 is a perspective view showing the piezoelectric actuator shown in FIG. 1.

As the detail is shown in FIG. 3, the piezoelectric actuator 4 includes: a rectangular plate-shaped piezoelectric element panel 15 composed of PZT which generates a force according to voltage impressed by the controller 8; a pair of copper electrodes arranged on both sides of the piezoelectric element panel 15; and a cover body 18 made of epoxy resin which covers the piezoelectric element panel 15 and copper electrode 16, wherein the cover body 18 is integrated with the piezoelectric element panel 15 and copper electrode 16 by means of thermo-compression bonding. In this connection, a conductive sheet containing Ni may be provided between the piezoelectric element panel 15 and the copper electrode 16, and both sides of the cover body 18 may be covered with a film of polyimide.

Figure 4:
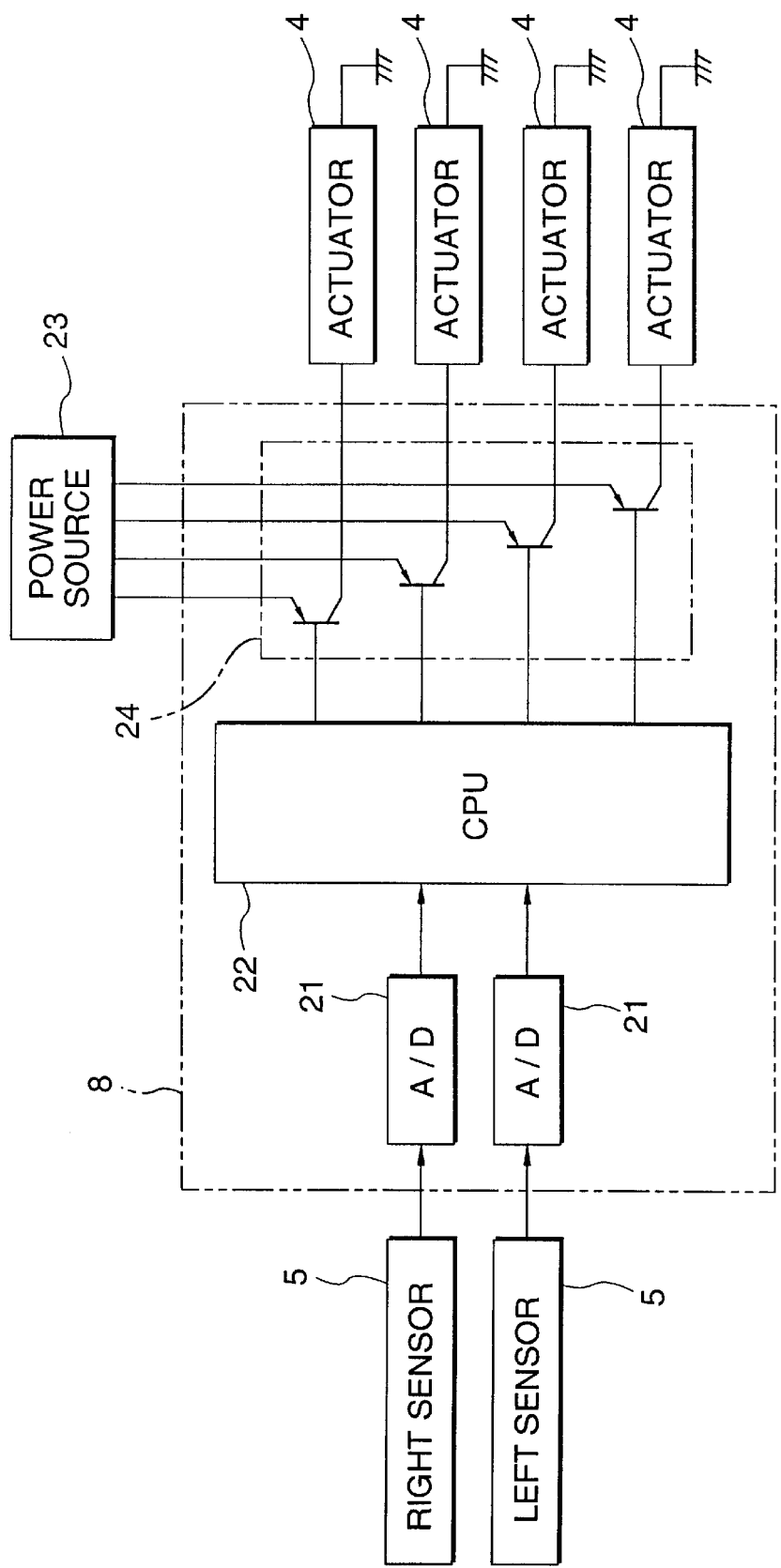
FIG. 4 is a block diagram showing the control device for controlling rigidity of a car body shown in FIG. 1.

As shown in FIG. 4, the controller 8 includes: a pair of A/D converters 21 for conducting A/D conversion on the output signals of the right and the left acceleration sensor 5; CPU 22 for judging a form of collision according to the output signals of A/D converters 21 and also for outputting operation signals to predetermined piezoelectric actuators 4 according to the result of judgment; and a switching circuit 24 for impressing voltage of a power source 23 upon the piezoelectric actuators 4 by the switching motion of transistors according to the output signals of CPU 22.

Figure 5:
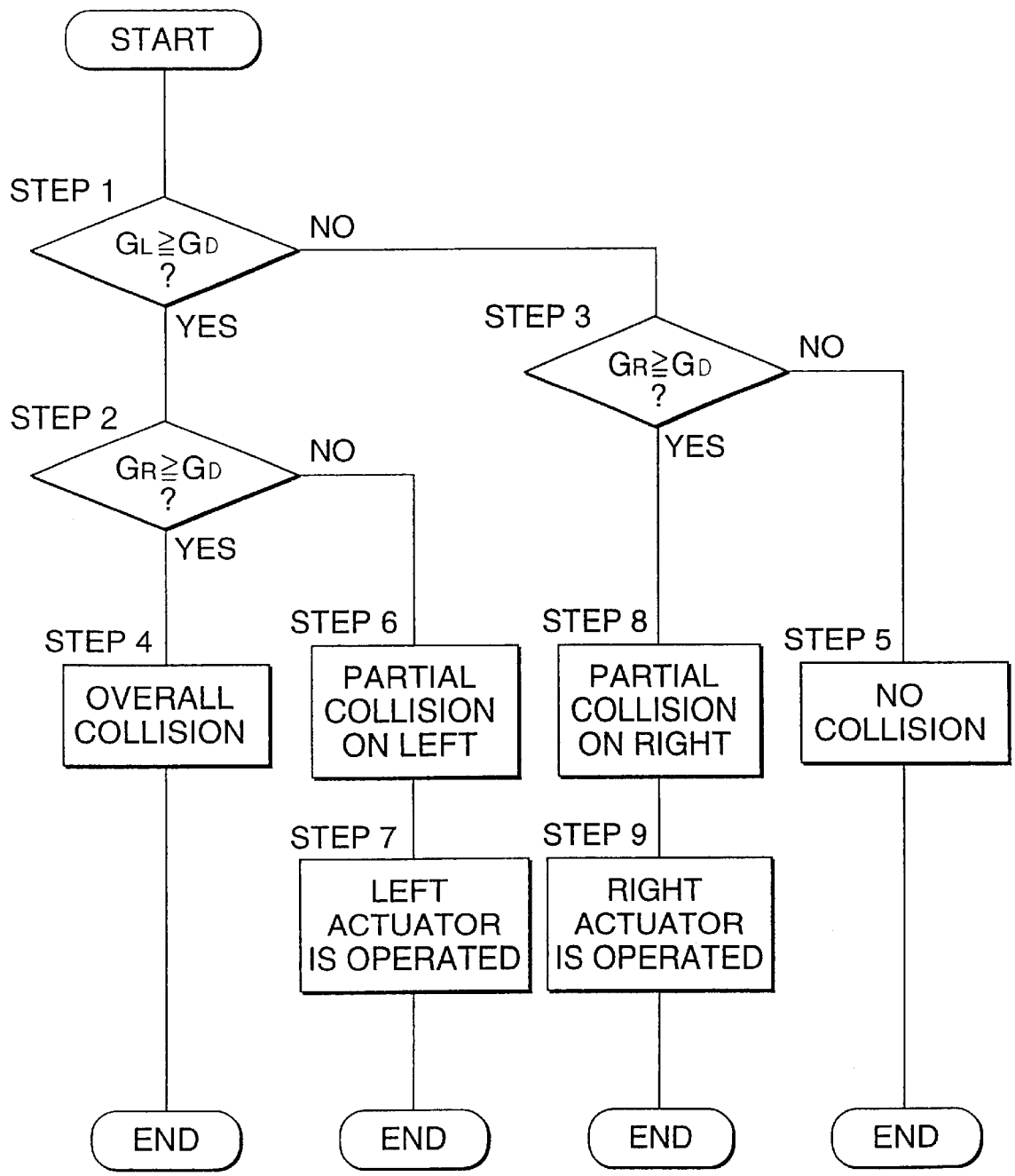
FIG. 5 is a flow chart showing a control method of the control device for controlling rigidity of a car body shown in FIG. 1.

In the control device for controlling rigidity of a car body composed as described above, output signals of the right and the left acceleration sensor 5 are always inputted into CPU 22 via A/D converter 21. Therefore, as shown in FIG. 5, acceleration signals $G_L$, $G_R$, which are output signals of the acceleration sensors 5, are compared with reference value $G_D$ previously stored in a memory section (not shown) in the controller 8 (steps 1 to 3). In this case, when both accelerations $G_L$, $G_R$ are not lower than reference value $G_D$, it is judged that the collision is an overall collision (step 4). In this case, the program is completed without operating the piezoelectric actuator 4. And both side frames 2, 3, the rigidity of which is set at a relatively low value so that the side frames 2, 3 can meet the requirement of an overall collision, are plastically deformed and an impact of collision is absorbed.

When both accelerations $G_L$, $G_R$ are lower than reference value $G_D$, it is judged that no collision has occurred (step 5). Therefore, the program is completed without operating the piezoelectric actuator 4 in the same manner as that described above.

On the other hand, when left acceleration $G_L$ is not lower than reference $G_D$ and right acceleration $G_R$ is lower than reference $G_D$, it is judged that the collision is a partial collision on the left (step 6). Therefore, voltage is supplied to the piezoelectric actuator 4, which is arranged in the left side frame 2, from a power source (step 7). When left acceleration $G_L$ is lower than reference $G_D$ and right acceleration $G_R$ is not lower than reference $G_D$, it is judged that the collision is a partial collision on the right (step 8). Therefore, voltage is supplied to the piezoelectric actuator 4, which is arranged in the right side frame 3, from the power source (step 9).

When voltage is impressed from the power source upon the piezoelectric actuator 4 arranged in either of the right 2 or the left side frame 3, an extending force is generated in the piezoelectric actuator 4 as shown by an arrow in FIG. 2. Due to the thus generated extending force, when an external collision force is inputted into the side frame 2, 3 in the axial direction as shown by arrow A in FIG. 2, a compressive deformation caused in a portion where the piezoelectric actuator 4 is arranged is restricted, so that rigidity of the side frame 2, 3 can be enhanced. Accordingly, the predetermined side frame 2, 3 can be put into a relatively high rigidity condition that is suitable for partial collision. In this way, the impact of collision can be appropriately absorbed.

In this case, the piezoelectric actuator 4 is operated in a direction so that rigidity of the side frame 2, 3 can be enhanced. However, it is possible to adopt an arrangement in which the piezoelectric actuator 4 is operated in a direction so that rigidity of the side frame 2, 3 can be reduced on the contrary. In this case, there are previously provided side frames 2, 3, the rigidity of which is relatively high so that the side frames 2, 3 can be suitably applied to partial collision, and only when it is judged that the collision is an overall collision (step 4 in FIG. 5), the piezoelectric actuators 4 of both side frames 2, 3 are simultaneously operated, and rigidity of both side frames 2, 3 is reduced to a value suitable for overall collision.

Figure 6:
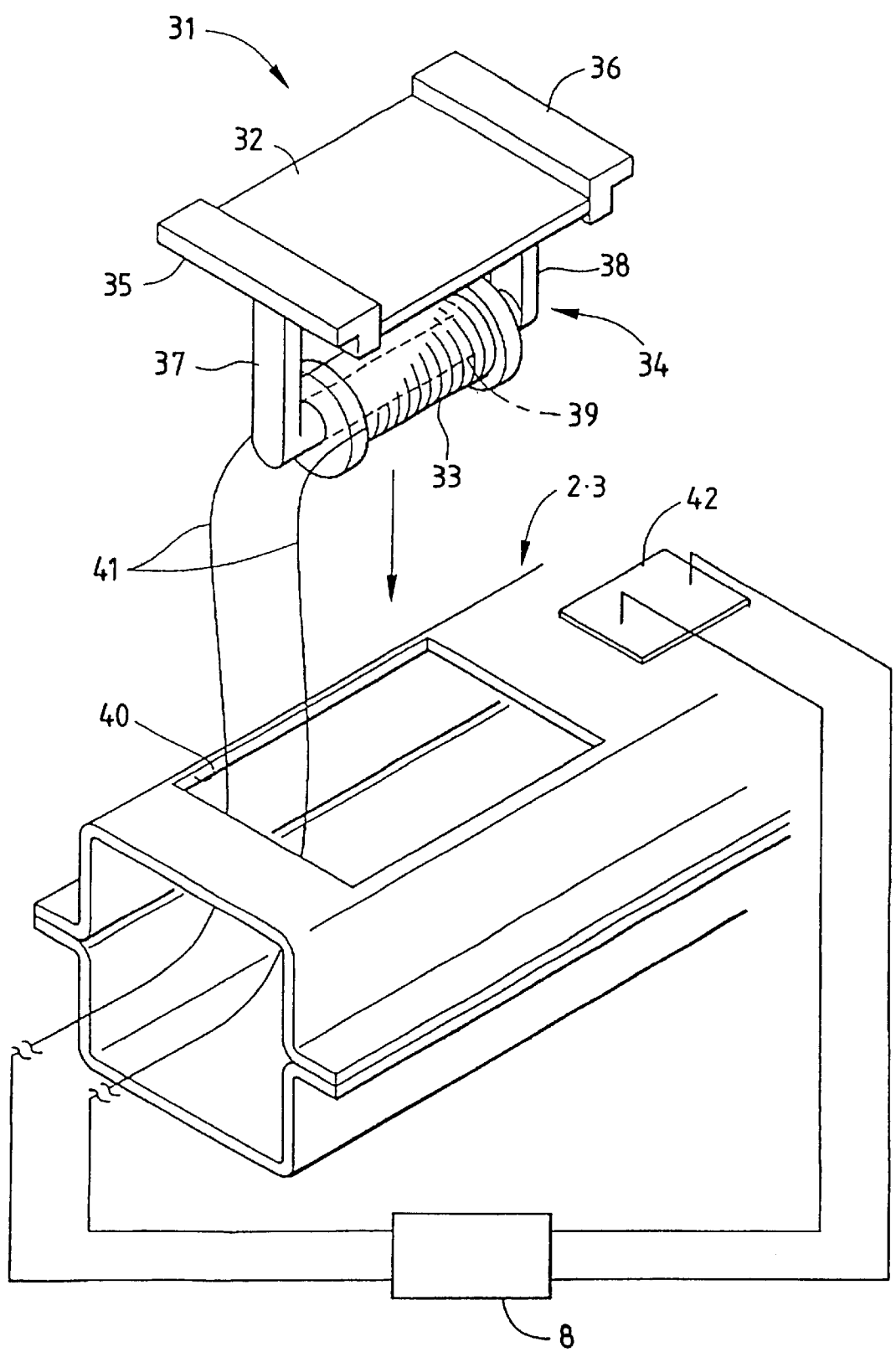
FIG. 6 is a perspective view showing a primary portion of a control device for controlling rigidity of a car body in which a magentostriction actuator is used.

FIG. 6 is a view showing an example in which a magentostriction actuator 31 is arranged in a straight line portion of the side frame 2, 3 so that it can be used as a frame rigidity adjustment means.

The magentostriction actuator 31 include: a magentostriction element panel 32 for generating a force according to an intensity of a magnetic field; an exciting coil 33 for generating a magnetic field to be impressed upon the magentostriction element panel 32; and a yoke 34 which is a magneto-induction means for inducing a magnetic field generated by the exciting coil 33 onto the magentostriction element panel 32. The magentostriction element panel 32 is a rectangular plate-shaped panel made of giant-magentostriction material such as alloy of Tb—Dy—Fe by a conventional forming method such as casting, cutting, sintering or vapor-deposition. The yoke 34 is made of soft magnetic material such as electromagnetic steel. The yoke 34 includes: a pair of magnetic poles 35, 36 respectively joined to a pair of side edge portions, which are opposed to each other, of the rectangular magentostriction element panel 32; a pair of arms 37, 38 which are extended from centers of both magnetic poles 35, 36 in the same direction; and an iron core 39 arranged between both arms 37, 38, wherein the exciting coil 33 is attached onto an outer circumference of the iron core 39. In this connection, surfaces of the magnetic poles 35, 36 coming into contact with the side frame 2, 3 may be covered with a magnetic sealing layer made of nonmagnetic material such as Mo or Al.

In this structure, the magentostriction actuator 31 is incorporated into a rectangular attaching hole 40 formed on a peripheral wall of the side frame 2, 3, and an operation current is supplied to the exciting coil 33 from the controller 8 via a lead wire 41 inserted into the side frame 2, 3.

On the peripheral wall of the side frame 2, 3, there is provided a strain sensor 42 composed of a piezoelectric element which is a collision detection means. A strain signal of the strain sensor 42 is inputted into the controller 8 at all times, and a form of collision is judged by the controller 8 according to this strain signal in the same manner as that described before.

According to the result of judgment of the form of collision, a control voltage is impressed upon the exciting coil 33 by the controller 8. Then, a force in a direction of suppressing strain of the peripheral wall of the side frame 2, 3 is generated on the magentostriction element panel 32. This force is transmitted to the side frame 2, 3 via the magnetic poles 35, 36 of the yoke 34. This force generated on the magentostriction element panel 32 suppresses deformation of a straight line section of the side frame 2, 3, so that a buckling stress of the straight line section of the side frame 2, 3 can be increased. In this way, it is possible to obtain a predetermined value of rigidity.

In this connection, the embodiment shown in FIG. 2 and the embodiment shown in FIG. 6 are different from each other in the viewpoints of the methods of attaching the piezoelectric actuator 4 and the magentostriction actuator 31 to the side frame 2, 3. Further, the embodiment shown in FIG. 2 and the embodiment shown in FIG. 6 are different from each other in the viewpoints of the positions at which the piezoelectric actuator 4 and the magentostriction actuator 31 are attached. However, the piezoelectric actuator 4 and the magentostriction actuator 31 have the same function. Therefore, it is possible to adopt an arrangement in which both actuators are arranged in the opposite way, and it is also possible to adopt an arrangement in which both actuators are combined with each other appropriately.

Figure 7:
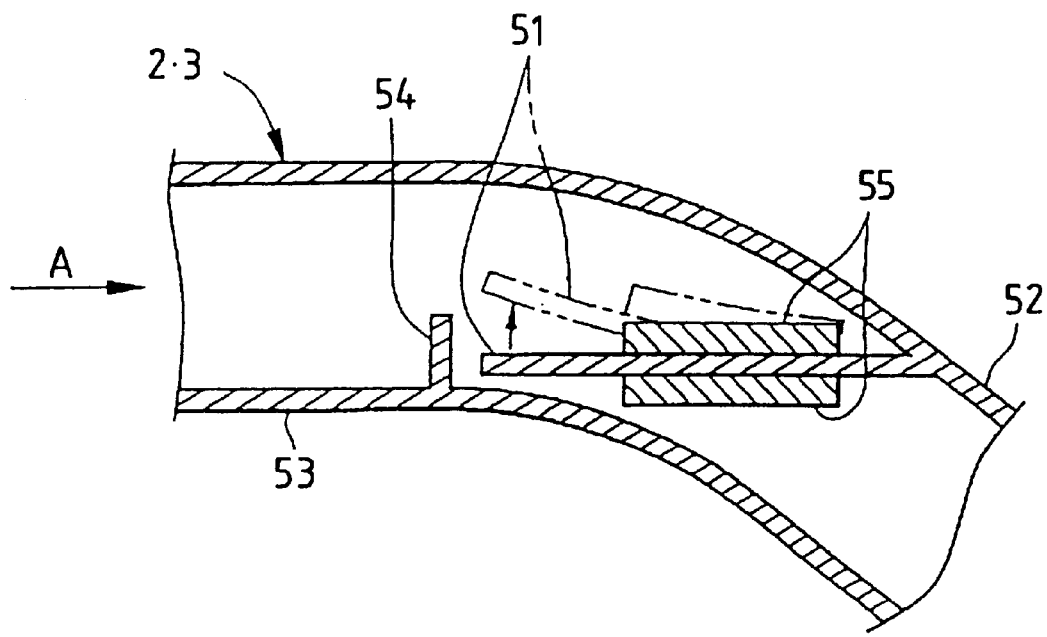
FIG. 7 is a longitudinal cross-sectional view showing a primary portion of a control device for controlling rigidity of a car body in which a reinforcement plate is used.

FIG. 7 is a view showing an example in which a reinforcement plate 51 is arranged inside a right and a left hollow side frame 2, 3. In this structure, one end of the reinforcement plate 51, which is arranged in the substantially horizontal direction, is connected with a surface inside an inclined portion of the upper wall 52 of the side frame 2, 3, that is, the reinforcement plate 51 is attached in the manner of cantilever. In the proximity of the other end of the reinforcement plate 51, there is provided a protrusion 54 which is protruded from an inner surface of the lower wall 53 of the side frame 2, 3. On the upper and the lower surface of the reinforcement plate 51, there are respectively provided piezoelectric actuators 55, the structure of which is substantially the same as that of the piezoelectric actuator 4 shown in FIG. 3. Rigidity of the right and the left side frame 2, 3 is relatively low so that the side frames can meet the requirement of overall collision.

When an external collision force in the direction of arrow A is inputted into the side frame 2, 3 in the case where the reinforcement plate 51 is set horizontally at the initial position, a forward end of the reinforcement plate 51 is caught by the protrusion 54. Therefore, deformation of the upper 53 and the lower wall 53 of the side frame 2, 3 is regulated, so that rigidity of the side frame 2, 3 can be enhanced.

On the other hand, when an operation voltage is impressed upon the upper and the lower piezoelectric actuator 55, a contraction force is generated in the upper piezoelectric actuator 55, and an extending force is generated in the lower piezoelectric actuator 55. Accordingly, the reinforcement plate 51 is bent as shown by a virtual line in the drawing. When an external collision force is inputted into the side frame 2, 3 under the above condition, it is impossible for the forward end of the reinforcement plate 51 to engage with the protrusion 54, and the reinforcement plate 51 does not function effectively. Accordingly, the side frame 2,3 is plastically deformed in a relatively low rigidity condition.

In this case, unlike the control method in the embodiment shown in FIG. 5, only when it is judged that both acceleration $G_L$ and acceleration $G_R$ are not lower than reference $G_D$, that is, only when it is judged that the collision is an overall collision (step 4 in FIG. 5), the piezoelectric actuators 55 arranged on the reinforcement plates 51 of the right and the left side frame 2, 3 are simultaneously operated. Due to the foregoing, both side frames 2, 3 arranged on the right and left are set in a relatively low rigidity condition so that an impact of collision can be absorbed. Therefore, it is possible to reduce deceleration generated in the passenger's chamber.

In other cases, the piezoelectric actuators 55 are not operated, and the reinforcement plate 51 is kept at the initial position. Due to the foregoing, in the case of partial collision on the right or the left, the reinforcement plate 51 functions, and a predetermined side frame 2, 3 is plastically deformed in a relatively high rigidity condition. Therefore, an impact of collision can be appropriately absorbed.

In this connection, on the contrary to the above case, it is possible to adopt an arrangement in which the reinforcement plate does not function at the initial position and the reinforcement plate is displaced by the piezoelectric actuator 55 to a position at which the reinforcement plate functions. In this case, the same control method as that shown in FIG. 5 may be adopted. It is also possible to adopt an arrangement in which the piezoelectric actuator 55 is operated in such a manner that it displaces the reinforcement plate 51 and enhances rigidity of the reinforcement plate 51 itself. Further, it is possible to adopt an arrangement in which the same magentostriction actuator as the magentostriction actuator 31 shown in FIG. 6 is used instead of the piezoelectric actuator 55 in order to displace the reinforcement plate 51.

Figure 8:
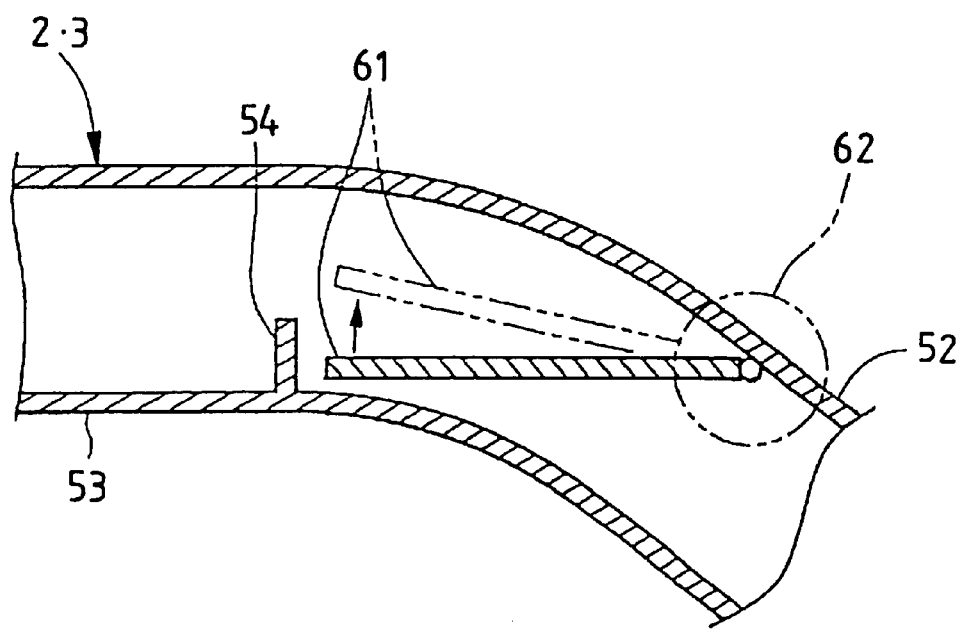
FIG. 8 is a longitudinal cross-sectional view showing a variation of the control device for controlling rigidity of a car body shown in FIG. 7.
Figure 9:
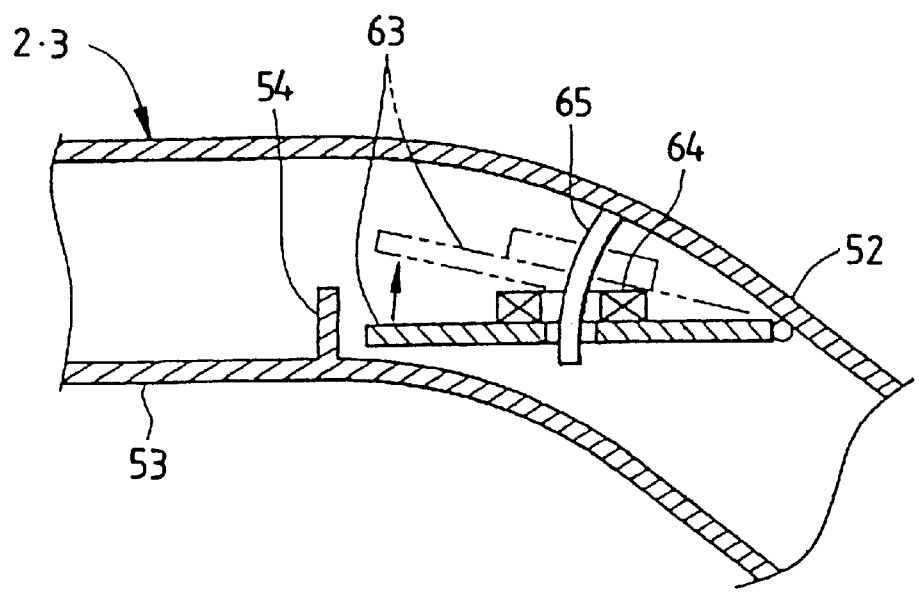
FIG. 9 is a longitudinal cross-sectional view showing another variation of the control device for controlling rigidity of a car body shown in FIG. 7.
Figure 10:
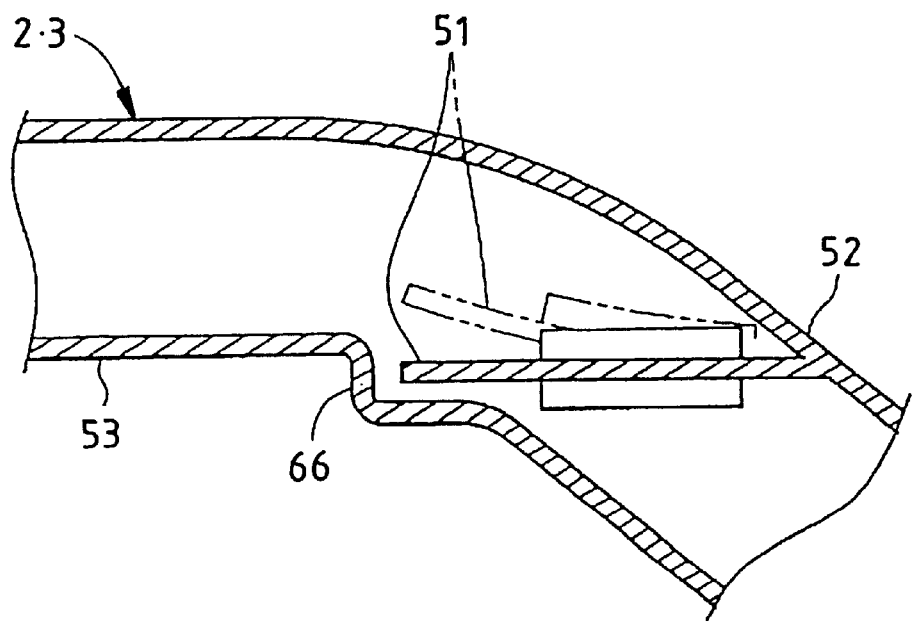
FIG. 10 is a longitudinal cross-sectional view showing still another variation of the control device for controlling rigidity of a car body shown in FIG. 7.

FIGS. 8 to 10 are views showing variations of the embodiment illustrated in FIG. 7. In the arrangement shown in FIG. 8, there is provided a reinforcement plate 61 at a bent section of the side frame 2, 3 in the same manner as that described before. This reinforcement plate 61 is arranged in such a manner that one end of the reinforcement plate 61 is tiltably fixed onto an upper wall 52 of the side frame 2, 3. By the action of a motor 62, which is operated according to an operation signal of the controller 8, the reinforcement plate 61 is tilted upward and displaced to a position at which the reinforcement plate 61 does not function as shown by a virtual line in FIG. 8. In this connection, it is possible to adopt an arrangement in which the reinforcement plate 61 is tilted by a spring instead of the motor 62. In this case, a lock means for locking the spring may be released according to an operation signal sent from the controller 8.

In FIG. 9, in the same manner as that of the embodiment shown in FIG. 8, the reinforcement plate 63 is tiltably fixed to the side frame 2, 3. This reinforcement plate 63 is tilted by a magnetic attraction force generated between a coil 64 arranged on the reinforcement plate 63 and a stationary iron core 65 arranged in the side frame 2, 3. In FIG. 10, instead of the protrusion 54 in the embodiment shown in FIG. 7, there is provided a step section 66, which engages with a forward end portion of the reinforcement plate 51, on a lower wall 53.

Figure 11:
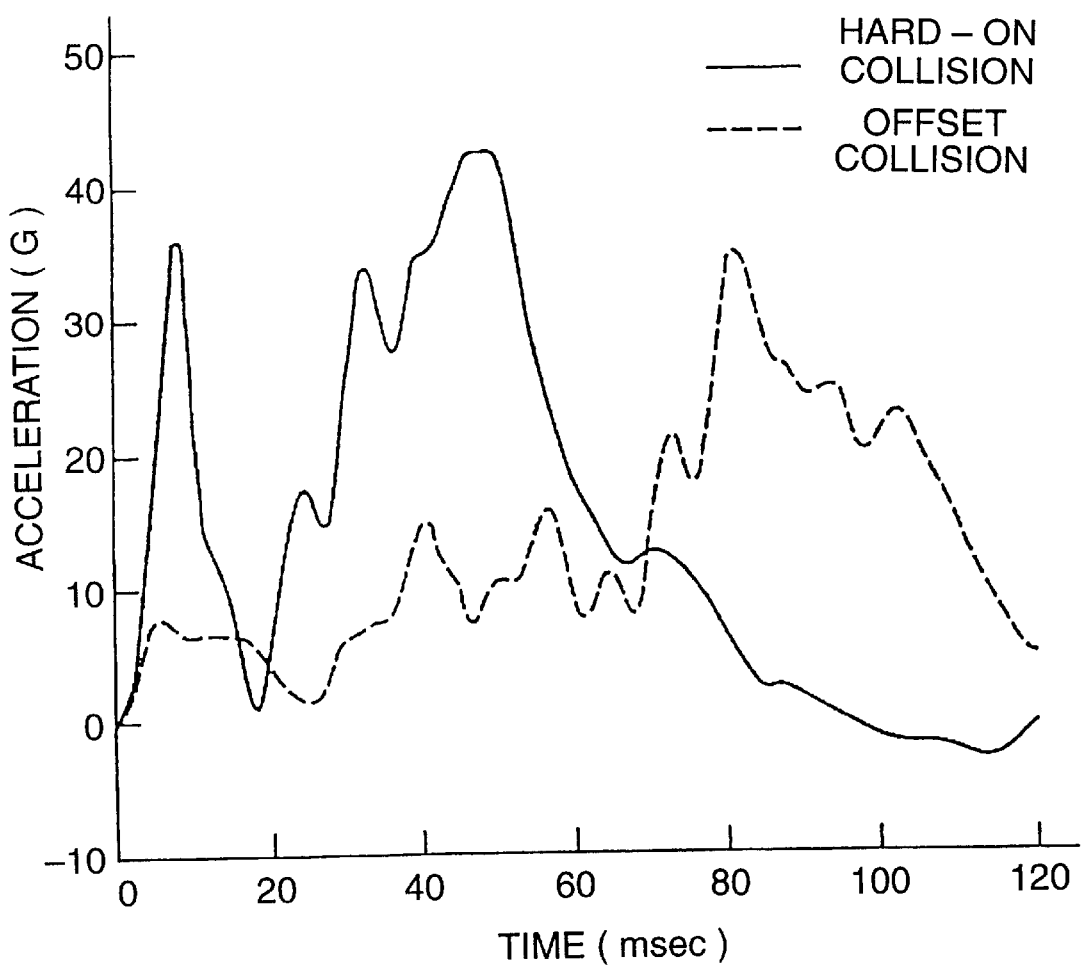
FIG. 11 is a graph showing a change with time of acceleration generated in a car body in collision.
Figure 12:
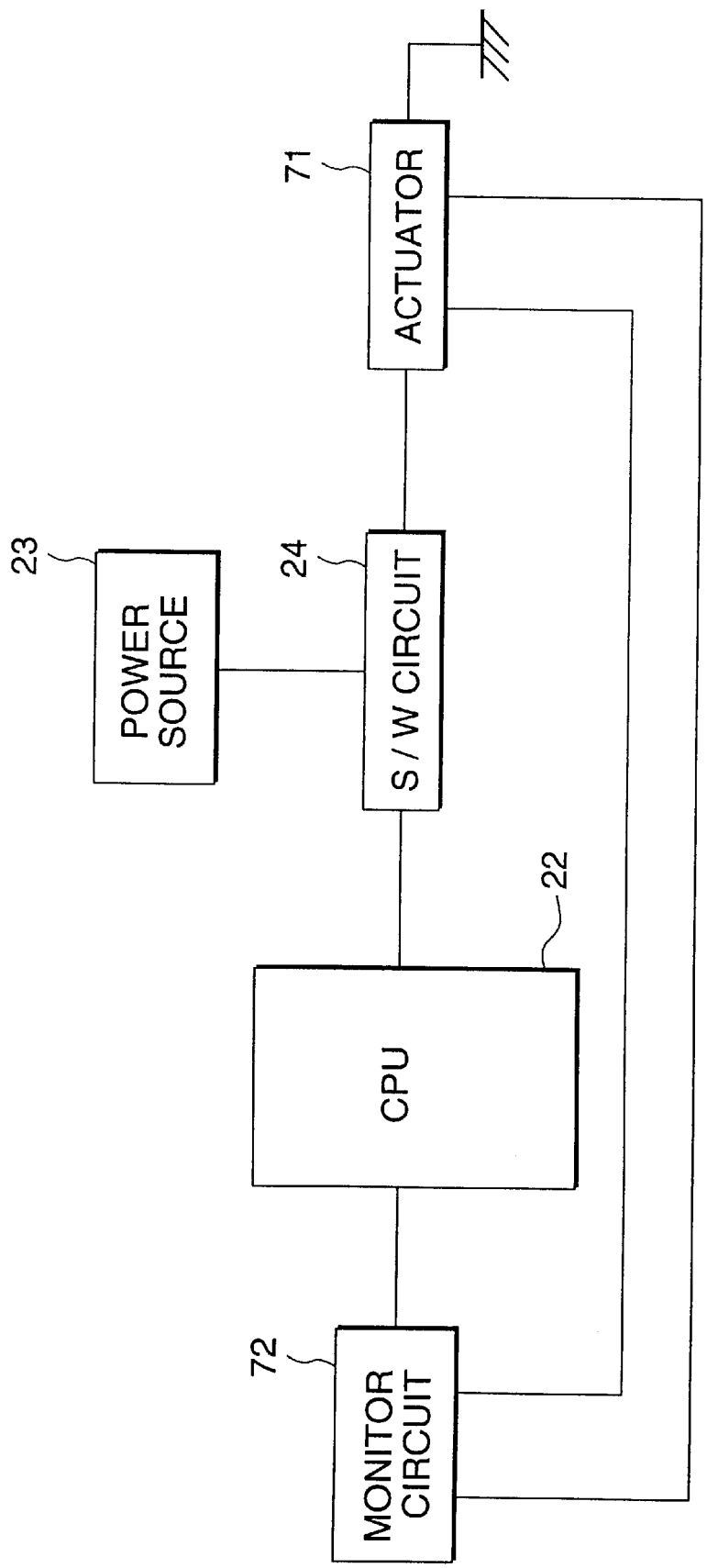
FIG. 12 is a block diagram showing an example in which a solid element actuator is also used as a collision detection means.

In this connection, in the embodiment shown in FIG. 1, a form of collision is judged by a difference of intensity between the acceleration detected by the right acceleration sensor 5 and that detected by the left acceleration sensor 5. However, it is possible to judge a form of collision by one acceleration sensor arranged at the center of a car body, for example, by one acceleration sensor arranged on the center frame 7. FIG. 11 is a graph showing changes in acceleration generated in a car body in the cases of an offset collision and a head-on collision of an actual car. As can be seen on the graph, there is a great difference between the waveform of the change in the offset collision and that of the change in the head-on collision. That is, a rise in the acceleration of the offset collision is slower than a rise in the acceleration of the head-on collision. Therefore, a peak of the acceleration of the offset collision is shifted from a peak of the acceleration of the head-on collision. When a judgment reference is made according to this difference, it is possible to discriminate a form of collision. When a form of collision is judged according to a peak generated in the proximity of 8 ms in the case of a head-on collision, it is possible to conduct judgment in its early stages. In this connection, the waveform of a change in acceleration shown in FIG. 11 depends upon the structure of a car body. Accordingly, when the judgment reference is actually made, it is made appropriately according to a car body into which this apparatus is incorporated. In the case where a form of collision is judged by one acceleration sensor, it is possible to share an acceleration sensor used for an air bag.

In the above embodiment, the acceleration sensor and the strain sensor are used for the collision detection means. However, since the piezoelectric element itself composing a solid actuator has a function of outputting voltage according to strain and the magentostriction element is capable of outputting a voltage signal via the exciting coil according to strain, it is possible to adopt an arrangement in which a solid element actuator 71 composed of the piezoelectric element or the magentostriction element is used for the collision detection means. In this case, a state of the solid element actuator 71 is monitored by the monitor circuit 72, and when strain is detected, the level of which is not lower than a predetermined value, a form of collision is judged by CPU 22. Other points of structure is the same as those shown in FIG. 4. That is, according to the result of judgment of a form of collision, an operation signal for operating the solid element actuator 71 is outputted from CPU 22, and voltage of the power source 23 is impressed upon the predetermined solid element actuator 71 via the switching circuit 24.

Figure 13:
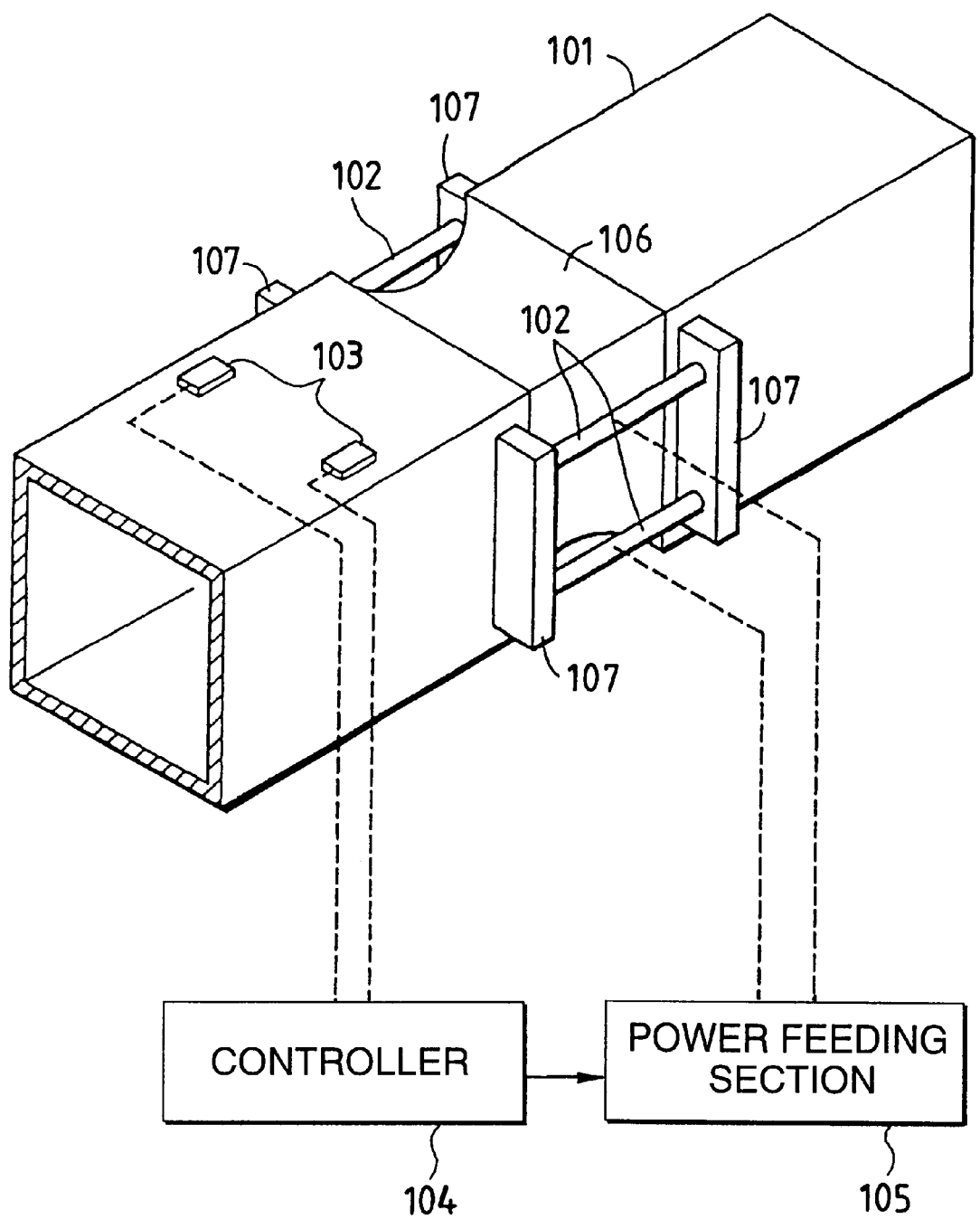
FIG. 13 is a perspective view showing an embodiment of the control device for controlling deformation of a frame of the present invention.

FIG. 13 is a view showing an embodiment of a control device for controlling deformation of a frame to which the present invention is applied. This control device for controlling deformation of a frame includes: a plurality of actuators 102 made of shape-memory alloy which are arranged on an outer surface of a square cylindrical frame 101; a plurality of strain sensors 103 for detecting an external force inputted into the frame 101; a controller 104 for outputting a control signal according to a signal sent from the strain sensor 103; and a power feed section 105 for feeding a drive electric current to the actuators 102 made of shape-memory alloy according to the control signal sent from the controller 104.

In the frame 101, there is provided a great deformation section 106, the mechanical strength of which is lower than that of the peripheral portion, and this great deformation section 106 is formed in such a manner that a portion of the circumferential wall of the frame is cut out all over the circumference. Moment of inertia of area of this great deformation section 106 is lower than that of the peripheral portion. Accordingly, this great deformation section 106 is greatly deformed by a relatively low force in the axial direction and bending moment. The actuators 102 made of shape-memory alloy are arranged over the great deformation section 106 and attached to a pair of attaching members 107 which are tightly fixed onto outer wall surfaces on both sides of the great deformation section 106.

The strain sensor 103 is tightly fixed onto the outer wall surface of the frame 101. This strain sensor 103 is capable of detecting an amount of strain in one direction, for example, in the axial direction of the frame 101. When amounts of strain detected by a plurality of strain sensors 103 are compared with each other, it is possible to judge a direction of the external force given to the frame. In this connection, when a pair of strain sensors 103 are arranged on one surface of the frame 101, the direction of the external force can be only judged two-dimensionally. However, when the strain sensors 103, the number of which is not less than three, are arranged on a plurality of surfaces of the frame 101, the direction of the external force can be judged three-dimensionally.

Figure 14:
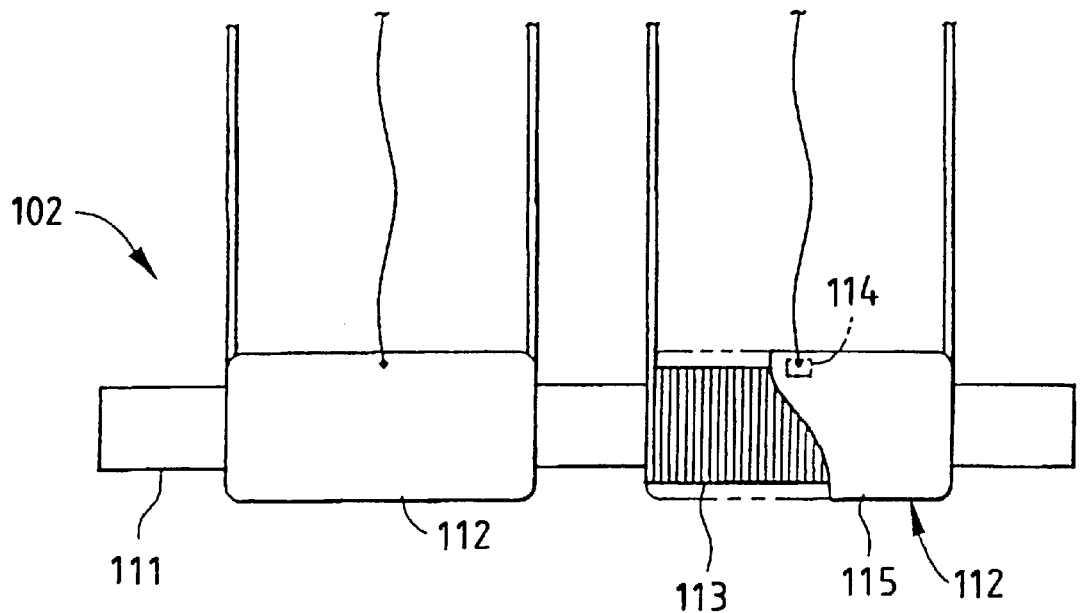
FIG. 14 is a front view showing an actuator made of shape-memory alloy.

As the detail is shown in FIG. 14, the actuator 102 made of shape-memory alloy includes: a rod 111 made of shape-memory alloy such as Ti—Ni—Cu; and a heater 112 arranged outside the rod 111 made of shape-memory alloy. The heater 112 includes: a heating coil 113, a thermocouple 114; and a covering body 115 made of ceramics which covers the heating coil 113 and thermocouple 114. The rod 111 made of shape-memory alloy is previously given a compressive deformation in the axial direction. When the rod 111 made of shape-memory alloy is heated by the heater to which electric current is fed from the power feeding section 105, an extending force in the axial direction can be generated.

Figure 15:
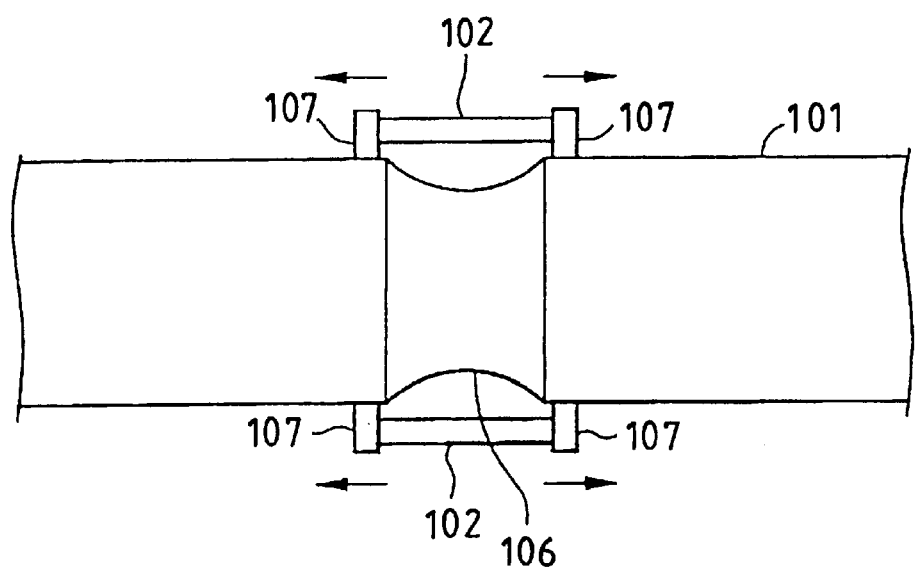
FIG. 15 is an upper surface view of a frame shown in FIG. 13.

As shown in FIG. 15, one pair of actuators 102 made of shape-memory alloy are arranged on one surface of the frame 101, and another pair of actuators 102 made of shape-memory alloy are arranged on the other surface of the frame 101, and these two surfaces of the frame 101 are opposed to each other. These actuators 102 made of shape-memory alloy can be independently controlled. When all actuators 102 made of shape-memory alloy are equally operated, it is possible to obtain an extending force in the axial direction of the frame 101. On the other hand, when the actuators 102 made of shape-memory alloy are unequally operated, it is possible to obtain a bending moment in a predetermined direction in addition to the extending force in the axial direction. In this connection, the number and positions of the actuators 102 made of shape-memory alloy are not limited to the above specific arrangement, but they may be appropriately determined so that a predetermined force in the axial direction and bending moment can be obtained according to the direction of a predicted external force.

In order to suppress deformation of the frame 101 when an external force in the axial direction of the frame 101 is given, all actuators 102 made of shape-memory alloy may be equally operated so as to cope with stress generated in the frame 101 in the axial direction. On the other hand, with respect to an external force in a direction oblique to the axial line of the frame 101, in order to cope with a force in the axial direction and bending moment generated in the frame 101, each actuator 102 made of shape-memory alloy may be operated by a predetermined ratio in accordance with an intensity and direction of external force given to the frame 101. When the actuators 102 made of shape-memory alloy are operated by a predetermined ratio so that an output exceeding an external force and also exceeding a resistance force of deformation of the great deformation section 106 can be outputted, it is possible to bend the great deformation section 106 and induce the frame into an arbitrary deformation condition.

Figure 16:
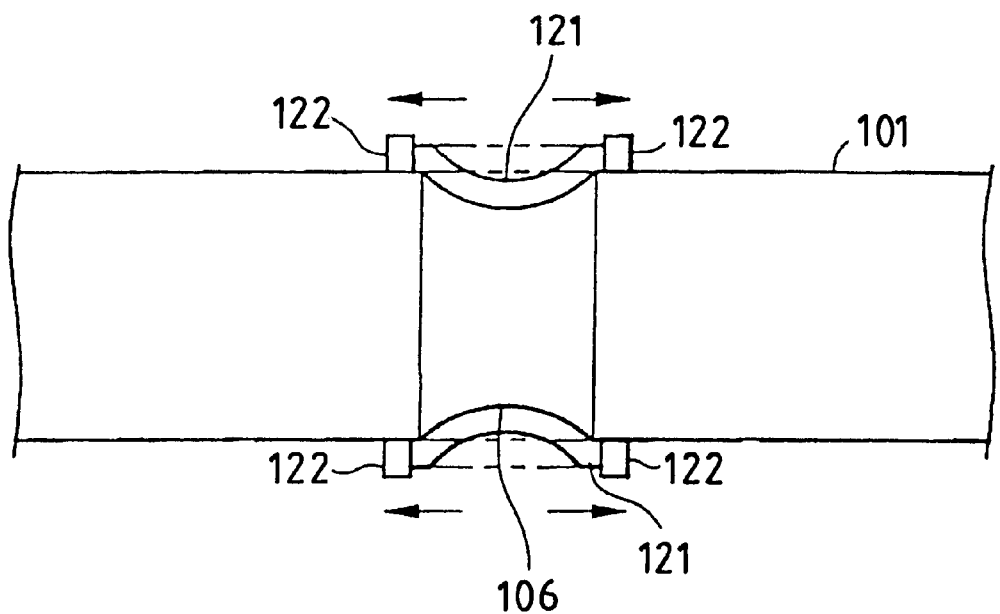
FIG. 16 is an upper surface view, which is drawn in the same manner as that of FIG. 15, showing another state of attaching an actuator made of shape-memory alloy.
Figure 17:
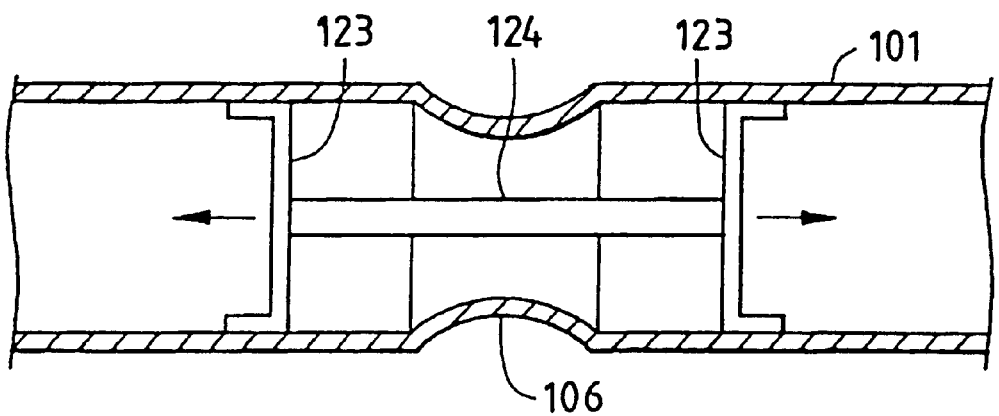
FIG. 17 is a cross-sectional view showing another state of attaching an actuator made of shape-memory alloy.
Figure 18:
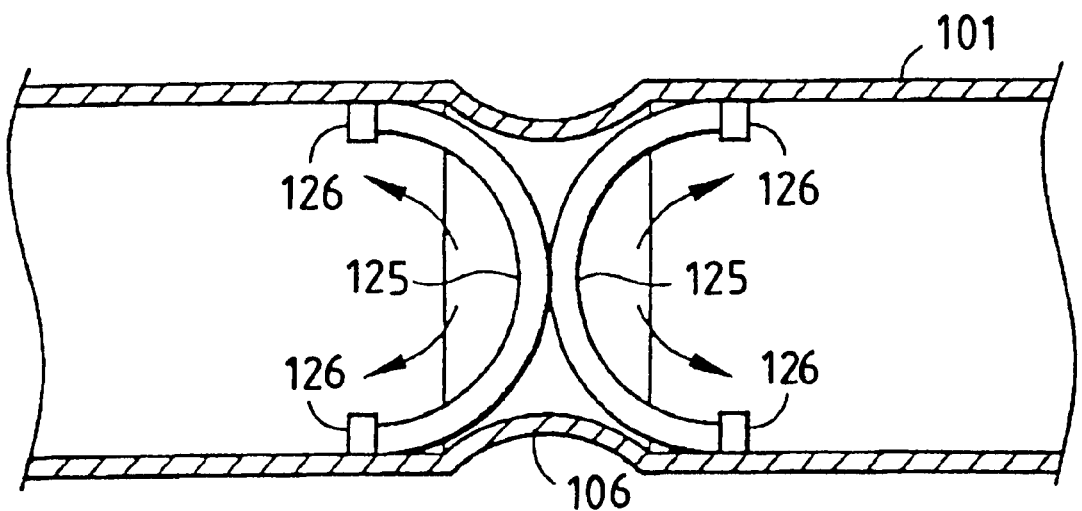
FIG. 18 is a cross-sectional view showing another state of attaching an actuator made of shape-memory alloy.

FIGS. 16 to 18 are views showing variations of the actuators 102 made of shape-memory alloy. The actuator 121 made of shape-memory alloy shown in FIG. 16 is arranged between the attaching members 122 fixed onto the outer wall surface of the frame 101 in the same manner as that of the actuator 102 made of shape-memory alloy described before. However, this actuator 121 made of shape-memory alloy is curved along an outer surface of the great deformation section 106. The actuator 121 made of shape-memory alloy having the above curved shape can be restored into a straight shape when it is heated. At this time, the attaching sections 122 arranged on both sides are spread by a force of the actuator 102 made of shape-memory alloy, and the frame 101 is given a predetermined extending force. In FIG. 17, there is provided a straight actuator 124 made of shape-memory alloy between the attaching members 123 arranged in the frame 101 in such a manner that the inside of the frame 101 can be partitioned by the attaching members 123. In this structure, when the straight actuator 124 made of shape-memory alloy is arranged at a position which deviates from the central axis of the frame 101, it is possible to obtain a predetermined bending moment. In FIG. 18, there are provided a pair of actuators 125 made of shape-memory alloy which are curved into an arc-shape, and both ends of the actuators 125 made of shape-memory alloy are fixed to the attaching members 126 which are fixed onto the inner wall surface of the frame 101, wherein opposing surfaces of the actuators 125 made of shape-memory alloy are made to come into contact with each other at the center. In this case, the frame 101 is given an extending force when a pair of actuators 125 made of shape-memory alloy, the centers of which are restricted to each other, are extended and restored.

Figure 19:
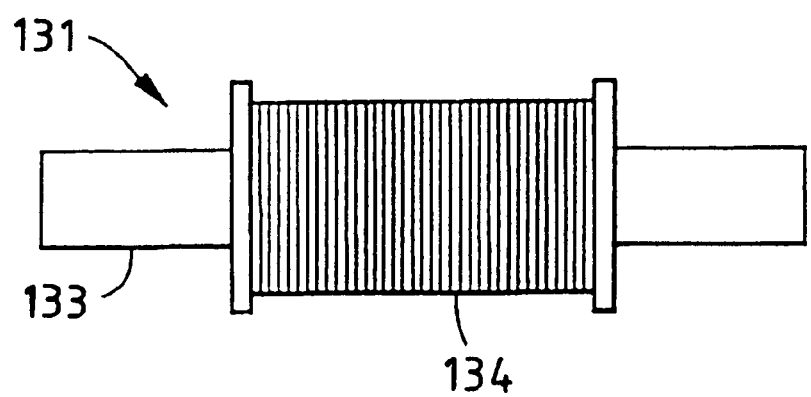
FIG. 19 is a front view showing a magentostriction element actuator.
Figure 20:
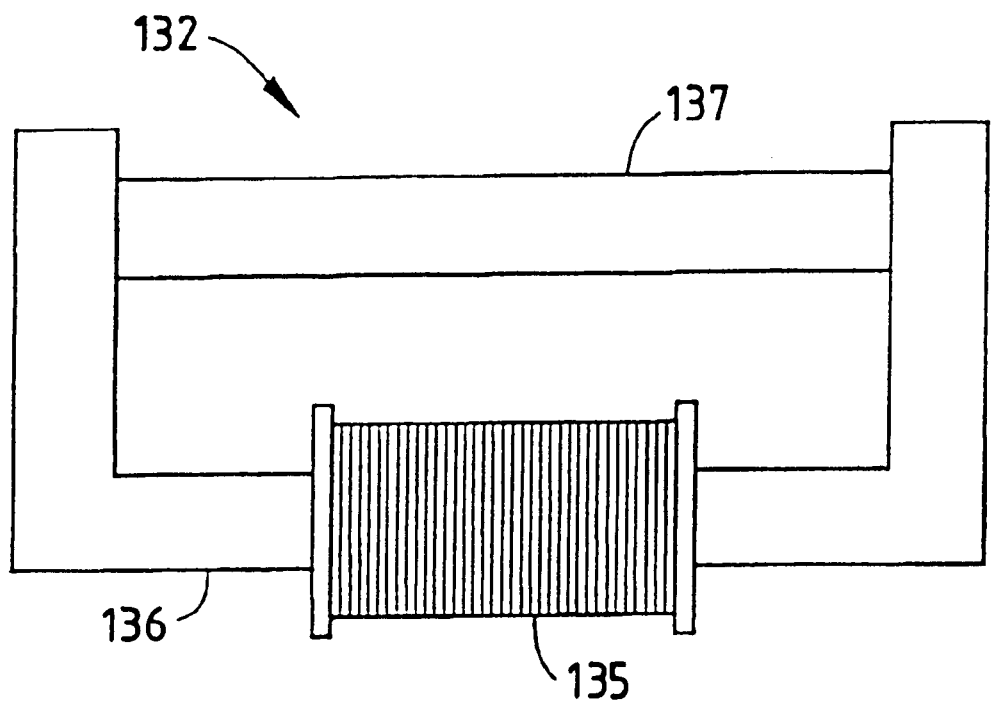
FIG. 20 is a front view, which is drawn in the same manner as that of FIG. 19, showing another state of a magentostriction element actuator.

Examples in which the actuators made of shape-memory alloy are used are shown above. Instead of the above examples, it is possible to use magentostriction element actuators 131, 132 as shown in FIGS. 19 and 20. The above actuator made of shape-memory alloy has no restoring property. Therefore, it is used only in a case in which plastic deformation is conducted by a relatively high intensity of external force. However, the magentostriction element actuator has a restoring property. Therefore, the magentostriction element actuator can be applied to a case in which elastic deformation is conducted by a relatively low intensity of external force such as an external force generated by vibration.

The magentostriction element actuator 131 shown in FIG. 19 is composed in such a manner that a magentostriction element rod 133 for generating a force according to an intensity of a magnetic field and an exciting coil 134 for impressing the magnetic field upon the magentostriction element rod 133 are coaxially arranged, wherein the exciting coil 134 is arranged on an outer circumference of the magentostriction element rod 133. The magentostriction element rod 133 is made of common ultra-magentostriction material such as Tb—Dy—Fe. In the magentostriction element actuator 132 shown in FIG. 20, a magnetic field generated by the exciting coil 135 is induced to the magentostriction element rod 137 via the magnetic inducing member 136. The magnetic inducing member 136 is made of soft magnetic material such as electromagnetic steel. These magentostriction element actuators 131, 132 are attached to the frame 101 via the attaching members 107 fixed onto a surface of the circumferential wall of the frame 101, or alternatively these magentostriction element actuators 131, 132 are attached to the frame 101 in such a manner that the magnetic inducing member 136 is also used as the attaching member.

Both the magentostriction element actuators 131, 132 and the actuators made of shape-memory alloy 102, 121, 124, 125 can be jointly used. For example, an example of the control method in which the actuator 102 made of shape-memory alloy shown in FIG. 14 and the magentostriction element actuator 131 shown in FIG. 19 are combined with each other is shown as follows.

First, inner stress of the frame 101 is calculated by the controller 104 according to an amount of strain of the frame detected by the strain sensor 103. When this inner stress exceeds a reference value (100 Mpa to 200 Mpa), it is judged to be plastic deformation, and the actuator 102 made of shape-memory alloy, which corresponds to plastic deformation, is operated. In this case, it is possible to operate the magentostriction element actuator 131 at the same time. Due to the foregoing, the breaking strength of the frame 101 can be enhanced.

On the other hand, in the different manner from that described above, the magentostriction element actuator 131 is operated at all times in a predetermined direction so that strain of the frame 101 can be restricted or facilitated according to an output of the strain sensor 103, so that deformation of the frame 101 is suppressed and the vibration characteristic is changed. Due to the foregoing, it is possible to enhance rigidity of the frame 101 and further vibration and noise can be reduced.

Figure 21:
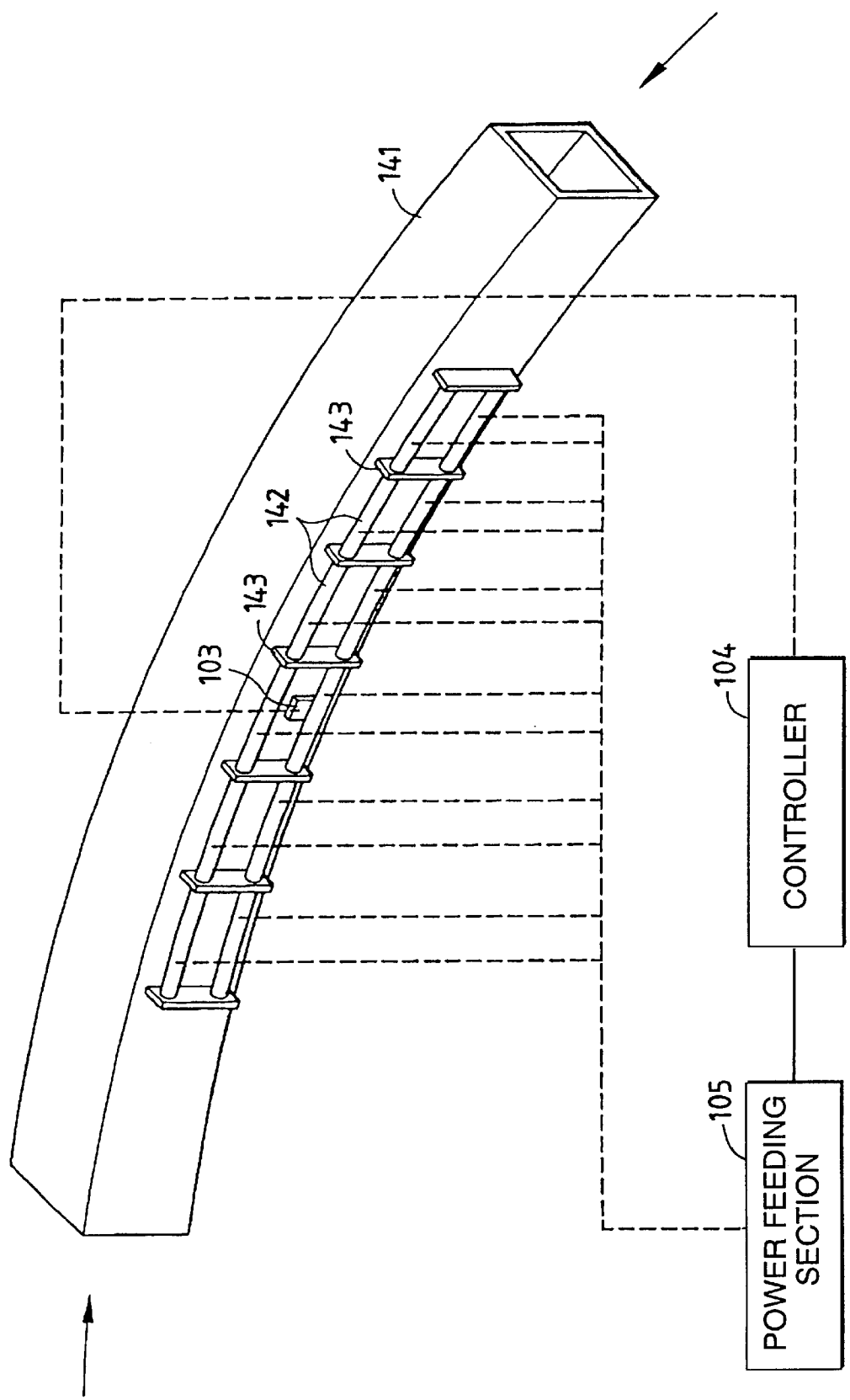
FIG. 21 is a perspective view showing another embodiment of the control device for controlling deformation of a frame of the present invention.

FIG. 21 is a view showing another embodiment of the control device for controlling deformation of a frame of the present invention. In this structure, there are provided a plurality of actuators 142 made of shape-memory alloy on a square cylindrical frame 141 which is entirely curved. In this case, pairs of actuators 142 made of shape-memory alloy are arranged in series. Each actuator 142 made of shape-memory alloy generates an extending force by a restoring stress in the same manner as that of the aforementioned actuator 102 made of shape-memory alloy. This actuator 142 made of shape-memory alloy is interposed between the attaching sections 143 which are tightly fixed onto an outer wall surface of the inside of the bent frame 141. In the same manner as that of the aforementioned embodiment, the control device for controlling deformation of a frame of this embodiment further includes: a plurality of strain sensors 103 for detecting an external force inputted into the frame 101; a controller 104 for outputting a control signal according to a signal sent from the strain sensor 103; and a power feed section 105 for feeding a drive electric current to the actuators 142 made of shape-memory alloy according to the control signal sent from the controller 104.

As shown by an arrow in FIG. 21, when a compressive force is given to the frame 141, stress in the axial direction and bending moment are generated in the frame 141. Buckling generated by this bending moment greatly affects a mechanical strength of the frame 141. On the other hand, when bending moment, which copes with bending moment generated by an external force, acts on the frame 141 by the extending force of the actuator 142 made of shape-memory, and buckling of the frame 141 can be prevented.

In this embodiment, the entire curved frame 141 corresponds to a portion in which a great deformation is predicted in the present invention. On the other hand, in the embodiment (shown in FIG. 13) described before, the great deformation section 106 corresponds to a portion in which a great deformation is predicted. However, it should be noted that the present invention is not limited to the above specific embodiments, but it is possible to adopt various embodiments. For example, it is possible to adopt an embodiment in which a portion of the frame is thinner than the peripheral portion so that the mechanical strength of the portion is lower than that of the peripheral portion. Since a great deformation is caused in a portion close to a reinforcement member such as a bulkhead for restricting deformation of the frame and also a great deformation is caused in a portion upon which deformation stress is concentrated according to a form of the neutral axis of the curved frame. Therefore, these portions are suitable for controlling deformation.

Figure 22:
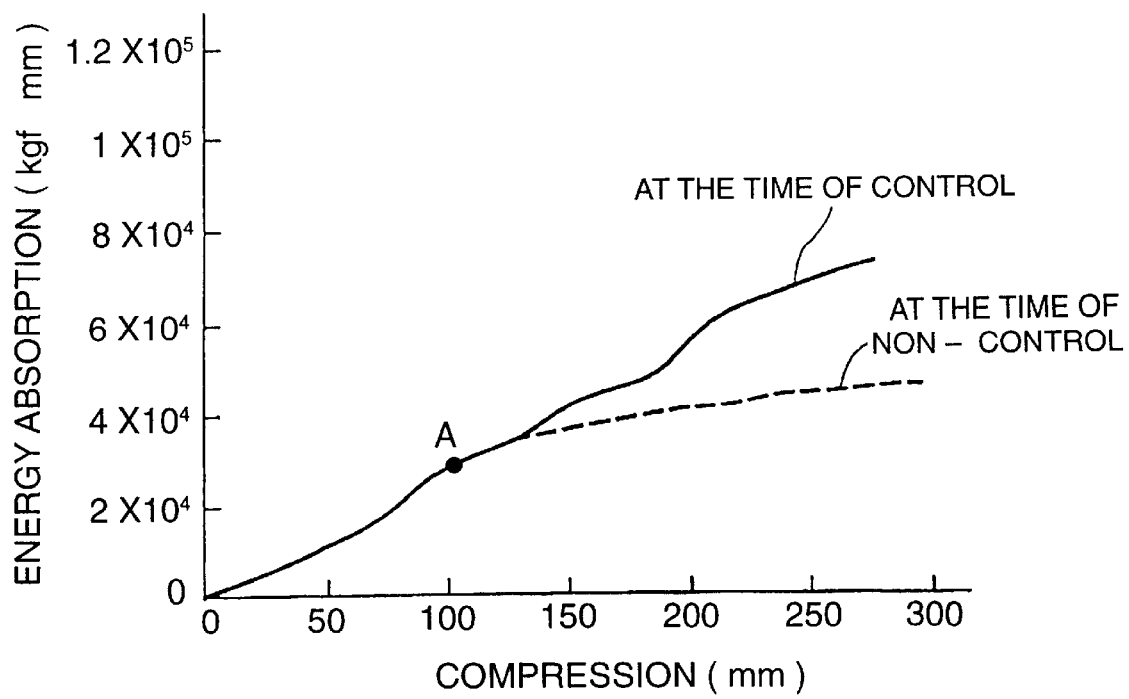
FIG. 22 is a graph showing a result of a compression test.

The frame 141 of the embodiment (shown in FIG. 21) to which the present invention is applied was actually manufactured, and a compressive strength test was made. The result of the strength test is shown in FIG. 22. According to the result of the test, the following were found. When no control was conducted, that is, when no deformation control was conducted by the actuator 142 made of shape-memory alloy, an amount of absorbed energy was not increased any more at a point where an amount of compression exceeded 100 mm, and buckling was caused at point A in FIG. 22. On the other hand, when control was conducted, no buckling was caused, and an amount of absorbed energy was continuously increased. This is substantially the same as a straight frame of the same cross-section. Therefore, it was found that the deformation control capacity was sufficiently high.

As described above, according to the present invention, rigidity of the right and the left side frame is adjusted to a value appropriate for a form of collision by the rigidity adjustment means of the right and the left side frame. Therefore, an impact of collision can be appropriately absorbed in any form of collision of head-on collision or partial collision. Accordingly, it is possible to effectively protect passengers from an impact of collision.

Further, a state of deformation of a frame is controlled by operating actuators according to an intensity and direction of an external force. Therefore, various strength characteristics such as a breaking characteristic and vibration characteristic can be arbitrarily changed. Due to the foregoing, for example, the frame of a car body can be appropriately deformed in collision, so that passengers can be protected more positively. Further, when the vibration characteristic is changed, it becomes possible to reduce vibration and noise. Furthermore, when rigidity of the frame is increased, stability can be enhanced in running. Furthermore, various strength characteristics do not rely on the shape of the frame. Therefore, the degree of freedom of designing the frame can be advantageously increased.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A control device for controlling deformation of a frame comprising:
    an actuator for generating a force in a direction of one of restricting and facilitating deformation of a frame;
    an external force detection sensor for detecting a n external force input ted into the frame; and
    a controller for controlling an operation of said actuator according to an output signal of said external force detection sensor,
    wherein said actuator is arranged in a portion of the frame in which deformation of the frame greater than that in a periphery thereof is predicted, so that the deformation of the frame is suppressed or a shape of the frame is induced to a predetermined shape according to the external force obtained from the output signal of said external force detection sensor.

2. A control device for controlling deformation of a frame according to claim 1, wherein said actuator comprises a member made of shape-memory alloy, which is previously deformed by compression, and an electrically heating body for heating said member made of shape-memory alloy according to a control signal sent from the controller.

* * * * *